United States Patent [19]

Takahashi et al.

[11] Patent Number: 4,697,904
[45] Date of Patent: Oct. 6, 1987

[54] AUTOMATIC FOCUSING SYSTEM

[75] Inventors: Kouji Takahashi; Akihiro Fujiwara, both of Kanagawa, Japan

[73] Assignee: Canon Kabushiki Kaisha, Tokyo, Japan

[21] Appl. No.: 799,442

[22] Filed: Nov. 19, 1985

[30] Foreign Application Priority Data

Nov. 28, 1984 [JP] Japan .................. 59-250871

[51] Int. Cl.⁴ .............................................. G03B 3/00
[52] U.S. Cl. .................................. 354/403; 250/351
[58] Field of Search ................ 354/403; 356/1, 4; 250/351, 338, 201 AF

[56] References Cited

U.S. PATENT DOCUMENTS 4,065,778 12/1977 Harvey ........................ 354/403
4,533,227 8/1985 Takahashi ..................... 354/403
4,561,746 12/1985 Matsuda et al. ............. 354/403 X
4,584,477 4/1986 Yoshino et al. .............. 356/4 X Primary Examiner—W. B. Perkey
Attorney, Agent, or Firm—Toren, McGeady & Associates

[57] ABSTRACT

A metering light is projected onto an object to be photographed, and the reflection from the object with illumination of the metering light is analyzed to derive an electrical signal in accordance with which the focusing position of a photographic lens is adjusted. When the reflection is found to include a radiation resulting from foreign illumination which is harmonic with the pulsating frequency rate of the metering light, the output of the metering light source is modulated to a random pulsating form.

4 Claims, 18 Drawing Figures

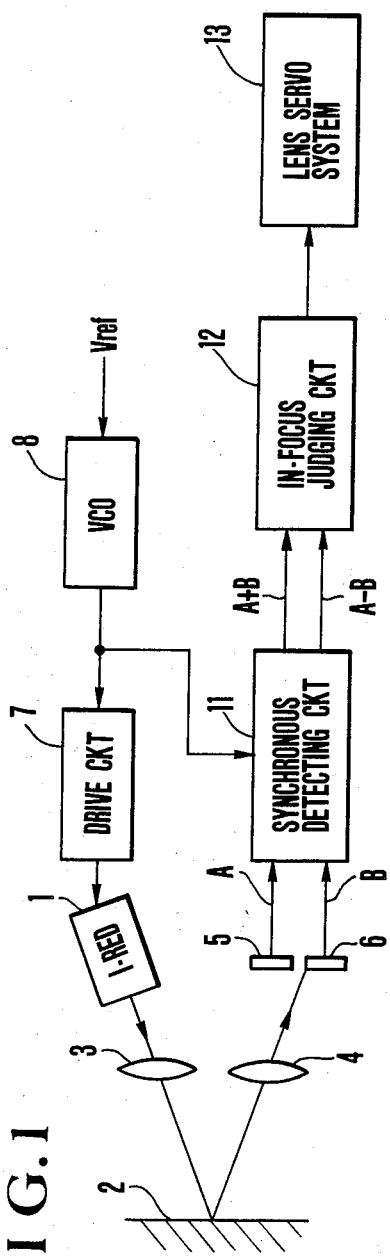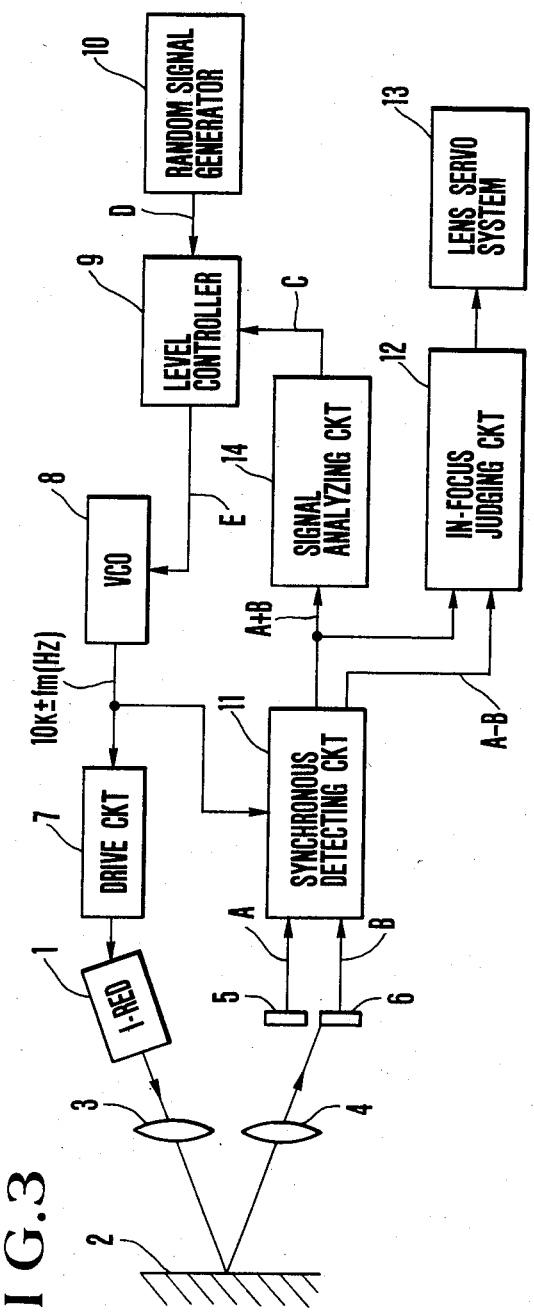

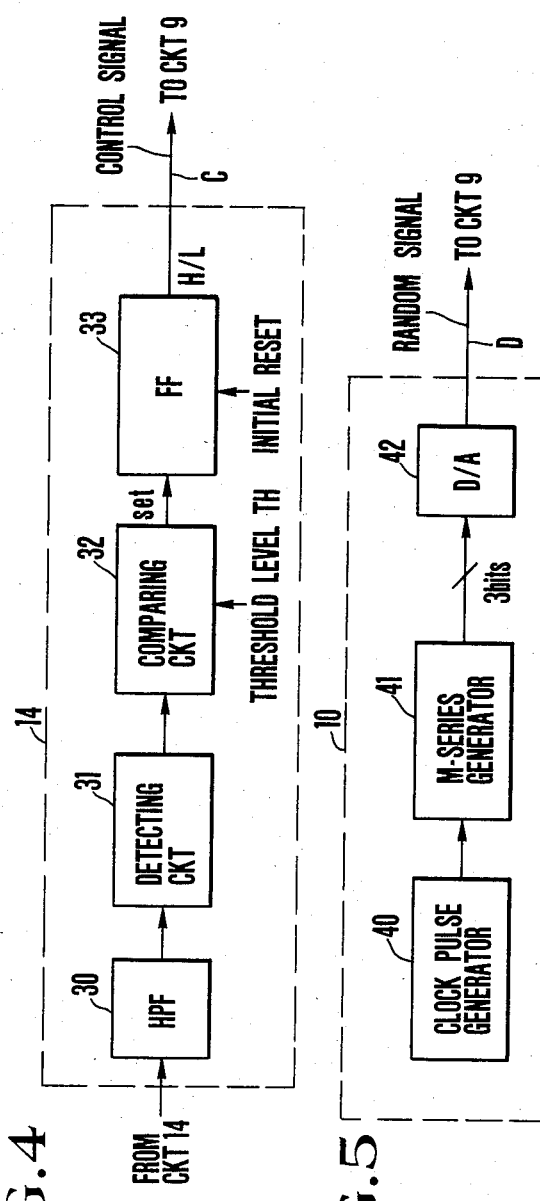
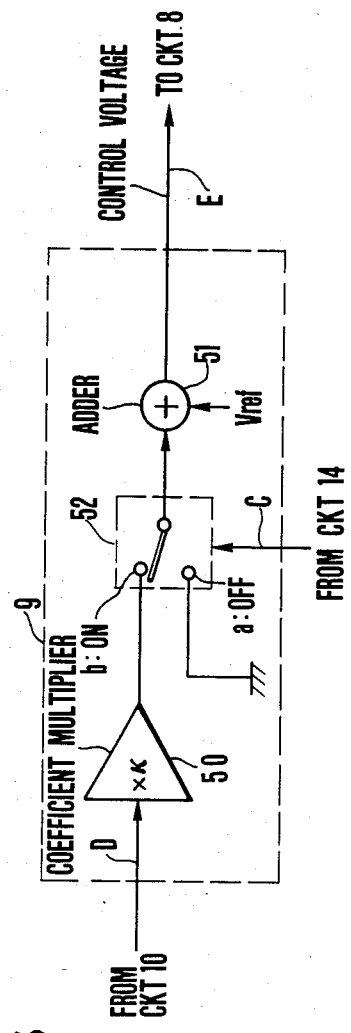
FIG. 4
FIG. 5
FIG. 6

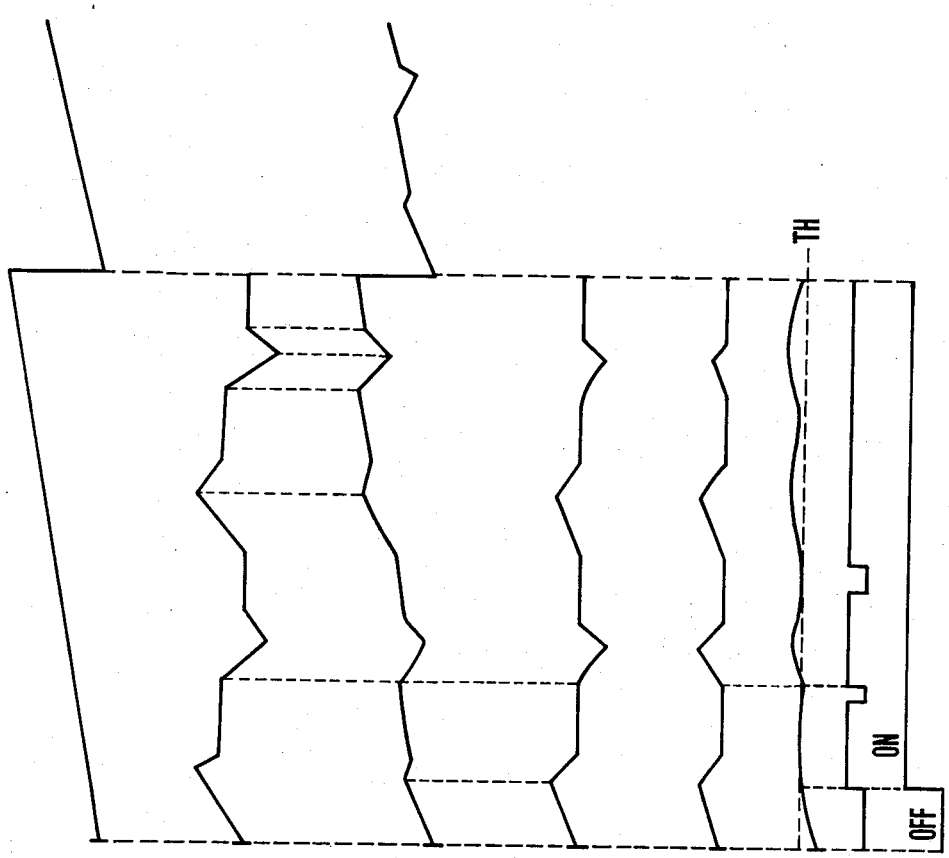

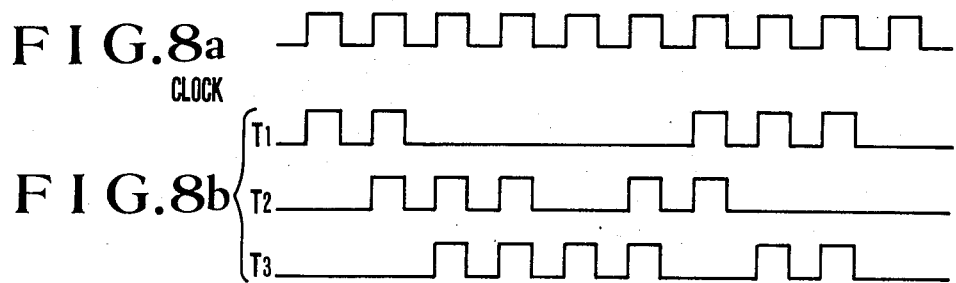
FIG. 8a CLOCK
FIG. 8b { T1, T2, T3 }
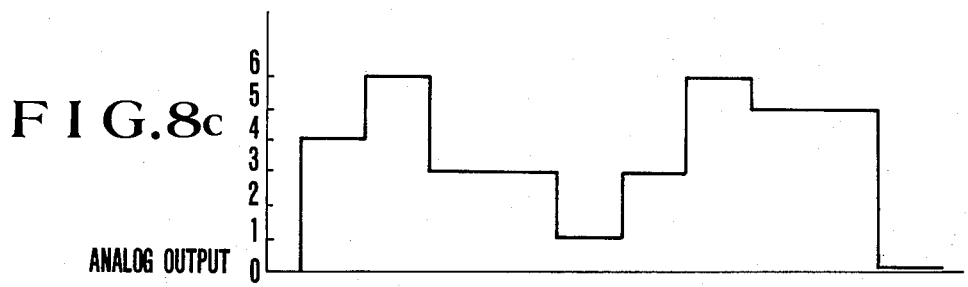
FIG. 8c
ANALOG OUTPUT
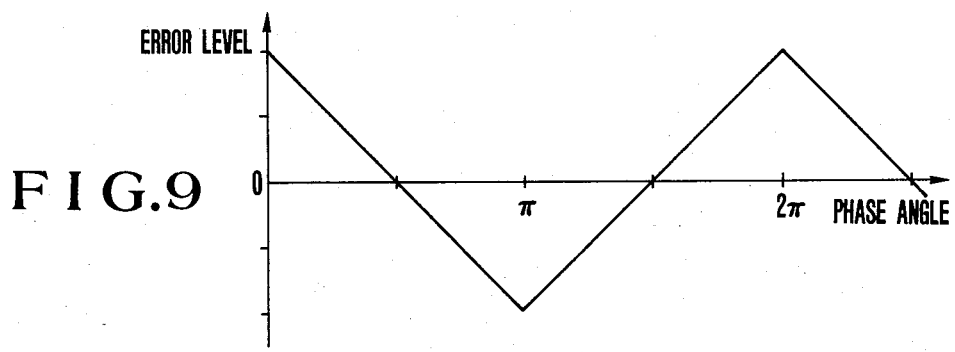
FIG. 9
ERROR LEVEL
$\pi$    $2\pi$   PHASE ANGLE

AUTOMATIC FOCUSING SYSTEM

BACKGROUND OF THE INVENTION

1. Field of the Invention

This invention relates to automatic focusing systems, and more particularly to automatic focusing systems in which light is projected onto an object to be photographed and its reflection is received to form focusing adjustment.

2. Description of the Prior Art

The in-focus detectors, in which light is projected onto an object to be photographed and the reflection from the object is received by a sensor to determine whether an objective is in focus or out of focus on the object, are known as the so-called "active" type.

A conventional example of such detectors is shown in FIG. 1, wherein a light emitter 1, such as an infrared light-emitting diode, transmits a train of light signals toward an object 2 to be photographed; as its energization, the light emitter 1 is driven b a drive circuit 7. 3 is a projection lens. The reflection from the object 2 is collected by a lens 4 and received by a pair of photoreceptors 5 and 6 such as SPCs. On receipt of the outputs A and B from the photoreceptors 5 and 6, a synchronous detecting circuit 11 produces outputs representing A+B and A−B, respectively, which are then applied to an in-focus judging circuit 12. Using the output of the circuit 12, a servo system 13 controls the operation of a lens.

A voltage-controlled oscillator (VCO) 8 is provided for determining the timing of energization of the infrared light-emitting diode 1 and the timing of synchronous detection. For note, Vref at an input of VCO 8 is a reference voltage for determining the frequency of oscillation (usually 10 KHz or thereabout).

Here explained is the operation of the synchronism detecting circuit 11. Among the light signals received by the photoreceptors 5 and 6, there is a very large amount of noise resulting from foreign illumination. If such noise is present, no realistic use is possible. So, the outputs of the photoreceptors may be integrated in a positive direction during a period when the infrared light-emitting diode is driven, and then in the negative direction during another period when it is not driven, thereby the D.C. noise resulting from solar illumination or the like is removed.

This method is, however, unable to remove the other noise (for example, cyclic noise).

Further, when the same object is shot by two or more cameras whose focusing systems have the same characteristic at nearly, or exactly, the same time, it will very often happen that as the light projected from one camera, upon reflection from the object, not only is transmitted back to that camera, but strays into another camera, the latter is caused to operate in a wrong way.

To eliminate such problems, in most of the state-of-focus detectors, the light emitter is pulsed at a frequency of about 10 KHz, and the synchronism detecting circuit is rendered operative in synchronism with the energization of the emitter, thereby that component of the output of the photoreceptor which results from the non-harmonic foreign illumination with the frequency of the light emitter is not detected as the noise. If the scene is illuminated by fluorescent lamps or similar lighting of periodic nature, however, it is very hard to remove all influence of the foreign illumination. Also, as has been mentioned above, if the same scene is shot by a number of cameras of which at least two have the same kind of automatic focusing system, it is unavoidable that the probability of occurrence of a faulty operation in either of the cameras is highly increased. In case when the cameras used are still cameras, if there is a slight time lag between the actuations of release of two cameras, the probability of the faulty operation will be lowered regardless of their having the same kind of focusing system. But in the case of video cameras and cine cameras where shots require continuous focusing on an object whose distance from the camera is varying during the time it is photographed, or even in the case of still cameras, when a motorized shooting is carried out, the probability of occurrence of such a faulty operation will become very high, and the number of photographic situations where the use of such focusing system gives a fatal drawback to the camera will be highly increased.

FIG. 2 illustrates what faulty operation occurs in terms of the waveform of a focusing control signal. Assuming that the light emitter is driven by a train of pulses on line "a" whose duty ratio is 50%, while the same scene is illuminated by a lighting which is pulsed as shown on line "b", then the reflection-back light is detected, if the foreign illumination is not pulsed, in the form of a similar signal to that shown in line "a", but because of the foreign illumination being of periodic nature, suffers an error shown on line "c" when the light emitter is energized, and on line "d" when it is unenergized. As a result, on assumption that the reflection is received by the photoreceptors and their outputs are integrated to derive a focusing control signal, the supurious signals "c" and "d" cause the output of the integrator to take the form of a signal shown on line "e". For note, a time interval T is a minimum period in which the rising edges of the signals "a" and "b" coincide with each other, so that the signals "c", "d" and "e" change their waveforms recyclically taking the time interval T as a period.

The output of the integrator takes a value of zero at the end of the period T as shown in line "e", but it is at intermediate points P1 and P2 on the way that the output ripples with appreciable values of positive or negative sign. These ripples are finally introduced to the focusing control signal, so that a faulty operation of the camera occurs. In FIG. 2, owing to the ratio of the frequencies fa and fb of the signals "a" and "b" taken at a value of 3:2, respectively, the period T appears to get a small value. But there are many actual situations where the frequency fb comes to be very close to the frequency fa so that the width of the period T is usually very long. Thus, the probability that the signal "e" is not zero, that is, an error signal is formed, is very high.

As has been described above, the active type state-of-focus detector has a high probability of forming spurious signals from the periodic disturbing components of the illumination such as those of the ambient light source or the light emitter in the other detector of the same kind to interfere the automatic focusing operation. Therefore, the prior known detector has had a drawback of not insuring the high reliability and accuracy of automatic focusing control. Such a drawbacks, besides the emitter in the form of producing light, salient to the form of producing supersonic wave.

SUMMARY OF THE INVENTION

It is, therefore, an object of the present invention to eliminate the drawback of the conventional automatic focusing system resulting from the above-described phenomena by not fixing but changing the frequency of excitation of the light emitter.

BRIEF DESCRIPTION OF THE DRAWINGS

FIGS. 1 and 2 illustrate the prior art.

FIGS. 3 to 8c illustrate an embodiment of the invention.

FIG. 3 is a signal flow chart.

FIG. 4 is a block diagram of a faulty operation discriminating circuit.

FIG. 5 is a block diagram of a random pulse generator.

FIG. 6 is a schematic circuit diagram of a level controller.

FIGS. 7a to 7h are waveforms of signals appearing at the outputs of the various circuit elements.

FIGS. 8a to 8c are waveforms of the outputs of the random pulse generator.

FIG. 9 is a graph illustrating variation with phase angle of the error level in the form of the output of the in-focus judging circuit when the frequency of excitation of the light emitter is the same as that of the foreign illumination.

DETAILED DESCRIPTION OF THE PREFERRED EMBODIMENTS

Figure 2:
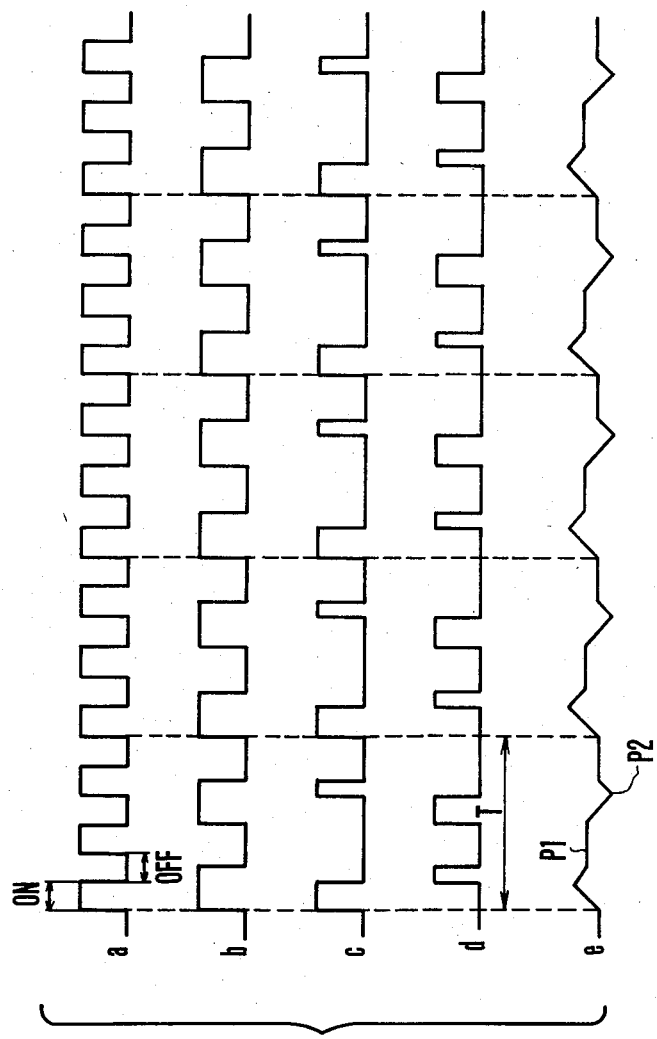

In FIG. 3, there is shown an embodiment of an automatic focusing circuitry according to the present invention where the same reference characters have been employed to denote the similar parts to those shown in FIG. 1. The two photoreceptors 5 and 6 produce outputs A and B, respectively, which are detected in synchronism by the synchronous detecting circuit 11 to form a signal representing A+B. Out of this signal is extracted a noise component by a signal analyzing circuit 14, from which a level control signal C is produced.

Referring to FIG. 4, the signal analyzing circuit 14 comprises a high pass filter (HPF) 30, a detecting circuit 31, a comparing circuit 32 having a threshold level TH, and a flip-flop (FF) 33.

FIG. 5 illustrates the details of the random signal generator 10 comprising a clock pulse generator 40, an M-series generator 41 for producing random digital signals time-sequentially, and a D/A converter 42 receptive of the output of the generator 41 for producing a random signal in analog form.

FIG. 6 illustrates the details of the level controller 9 comprising a coefficient multiplier 50, a switch 51, and an adder 52.

The operation of the circuit of FIGS. 3 to 6 is next explained. Now assuming that the light signals received by the photoreceptors 5 and 6 are included with noise components, then the waveforms at the various points in the block diagrams are caused to change as follows:

The input of the signal analyzing circuit 14 contains not only a component representing the integrated value of the sum of the pure outputs A and B, (FIG. 7a), but also a noise component (FIG. 7b) in superimposed relation, thus taking a waveform (FIG. 7c).

Out of this noise component, only high bands are extracted (FIG. 7d), and then changed to absolute values (FIG. 7e) and then integrated (FIG. 7f). The integrated value is compared with the threshold level TH. If it is higher than the TH, the comparing circuit 32 produces an output (FIG. 7g) which is applied to set the flip-flop (FF) 33. A logic signal "H" (FIG. 7h) is then produced from the FF 33.

In the random signal generator 10, a train of clock pulses (FIG. 8a) from the generator 40 are received by the M-series generator 41 to produce three trains of random pulses T1, T2 and T3 as shown in FIG. 8b. These pulse trains T1 to T3 are applied to the D/A converter 42, from which an analog signal whose waveform is shown in FIG. 8c is obtained.

In the level controller 9 of FIG. 6, the output D of the random signal generator 10 of FIG. 8c is multiplied by a coefficient k, while the operation of the switch 51 is controlled by the output signal C of the signal analyzer 14.

As in ordinary lighting situations, when the noise component resulting from the pulsating foreign illumination is weak, the output of the comparator circuit 32 cannot set the FF 33. Therefore, the output of FF 33 has low level, or logic "0". Responsive to this signal of low level, the movable contact of the switch 51 in the level controller 9 connects itself with a ground terminal "a", permitting that value of the reference voltage Vref, which is adapted to the normal frequency of excitation of the light emitter, to be applied to the output terminal E of the level controller 9. Thus, the light emitter 1 produces a train of light pulses with the prescribed constant frequency.

As the foreign illumination is harmonic with the frequency of the light emitter 1, when the signal analyzing circuit 14 determines that there is need to modulate that frequency, it changes its output signal C to high level as indicated by "ON" in FIG. 7h. Responsive to this signal, the switch 51 moves to its "b" position where the signal of random level shown in FIG. 8c, after having been increased k times by the coefficient multiplier 50, enters the adder 52. Thus, the ever-varying amplitude of the random signal is superimposed on the reference voltage Vref, and the resulting reference voltage as an output E is applied to the voltage-controlled oscillator (VCO) 8. The output of VCO 8 is applied to the drive circuit 7 for the light emitter 1. The frequency of excitation of the light emitter 1 starts to change at a time when the switch 51 has taken the "b" position. The speed of modulation depends on the frequency of the clock pulses in the random signal generator 10 and the depth of modulation depends on the value of the coefficient k in the level controller 9. So it is desirable to adjust these variables to such values as to produce the highest spurious signal blocking effect.

In such a manner, when periodic noise enters, the frequency of oscillation or phase of VCO 8 varies at random.

For the ambient light source whose frequency coincides with that of the light emitter, how the level of error in the output of the in-focus judging circuit 12 varies with variation of the phase is shown in FIG. 9.

Let us now consider a photographic situation where two video cameras of the same kind are aligned to a common target area. Because their frequencies of oscillation are equal to each other, the phase difference established when the cameras are actuated independently of each other continues unchanging. As is understandable from FIG. 9, the phase differences other than $\pi/2$ and its odd integer multiplies lead to produce range finding errors.

The circuit of the invention responses to this circumstance by automatically changing the output of the VCO 8 to random form as has been described above. So, the coefficient multiplier 50 should be preset to such a value of the coefficient k that the output of VCO 8 gets a phase discrepancy of $\pm\pi$ at the maximum. Then, errors of positive and negative signs are equalized to each other in probability of occurrence. Of all process, therefore, thenet error can be nullified. This scheme is very suited particularly to a circuit in which the integration-detection is carried out by the synchronous detecting circuit 11 as in the embodiment of the invention.

According to the invention, the error due to the periodic foreign illumination is almost completely removed. Since the thus-obtained signal from the synchronous detecting circuit 11 is applied through the in-focus judging circuit 12 to the lens servo system 13, the lens is focused with an improved accuracy and reliability.

Though the foregoing embodiment has been described in connection with the use of infrared light for sweeping the target area, supersonic wave may be used instead, as has been mentioned before, thereby an equivalent result is even effected. In this case, though needless to say, a microphone or other suitable sound sensitive element must be used in place of the photoreceptors. Accordingly, it is not an essential prerequisite for the automatic focusing system of the invention to employ the triangulation method with the arrangement of the light emitter and the pair of photoreceptors in spaced relationship as in the illustrated embodiment, and it is, of course, possible to apply the principle of the invention to other types of automatic focusing system such as those measuring the time it takes to catch the reflected wave, namely, radar type, adn sensing the contrast to determine the object distance. It should be understood that any of examples of variation described above falls within the spirit and scope of the invention.

As has been described above, because, in the invention, all spurious signal resulting from any ambient light source of periodic property is blocked,in whatever scene and also in any situation where two or more similar automatic focusing systems are used, an accurate and reliabled focusing adjustment can be expected. In this respect, the advantage of the invention is very great.

What is claimed is:

1. An automatic focusing system comprising:
   (a) means for projecting a metering radiation onto an object to be photographed;
   (b) means for controlling the operation of said light emitting means so as to project the radiation in the form of pulses;
   (c) means for receiving the reflection-back radiation from the object;
   (d) means for judging an in-focus condition on the basis of a signal of said radiation receiving means;
   (e) means for controlling the movement of a lens in accordance with a signal from said judging means; and
   (f) means for changing the frequency of said radiation control means so that said pulses of radiation of said radiation projecting means occur randomly.

2. A system according to claim 1, wherein said frequency changing means includes a random signal generator and a level controller.

3. An automatic focusing system comprising:
   (a) means for projecting a metering radiation onto an object to be photographed;
   (b) means for making periodic the projection and non-projection of the radiation of said radiation projecting means;
   (c) means for receiving a reflection-back radiation from said object;
   (d) means responsive to a signal from said radiation receiving means for moving a photographic lens to an in-focus position; and
   (e) means receptive of a signal from said radiation receiving means and responsive to a judgment that, as the signal includes noise, the frequency of pulses of radiation from said radiation emitting means is necessary to change, for randomly changing the periodic output of said periodic means.

4. A system according to claim 3, wherein said changing means includes:
   (a) means for discriminating an erroneous operation in response to said metering radiation and noise; and
   (b) means connected to said periodic means for determining the frequency of pulses of radiation of said radiation emitting means, said means randomly changing the frequency of radiation pulses in response to a signal of said discriminating means.

* * * * *